(12) United States Patent
Newman et al.

(10) Patent No.: US 8,745,695 B2
(45) Date of Patent: Jun. 3, 2014

(54) HYBRID NETWORKING MASTER PASSPHRASE

(75) Inventors: Richard E. Newman, Gainesville, FL (US); Sidney B. Schrum, Ocala, FL (US); Lawrence W. Yonge, III, Summerfield, FL (US)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 13/420,420

(22) Filed: Mar. 14, 2012

(65) Prior Publication Data

US 2012/0239929 A1    Sep. 20, 2012

Related U.S. Application Data

(60) Provisional application No. 61/452,317, filed on Mar. 14, 2011.

(51) Int. Cl.
*H04L 29/06* (2006.01)
(52) U.S. Cl.
USPC .................................. 726/2; 726/5; 713/168
(58) Field of Classification Search
USPC ....................... 713/168, 153; 726/2, 5, 11–15
See application file for complete search history.

(56) References Cited

U.S. PATENT DOCUMENTS

| 6,130,896 | A | 10/2000 | Lueker et al. |
| 6,272,551 | B1 | 8/2001 | Martin et al. |
| 6,629,246 | B1 * | 9/2003 | Gadi ................................ 726/8 |
| 6,947,736 | B2 | 9/2005 | Shaver et al. |
| 7,113,763 | B2 | 9/2006 | Heinonen et al. |
| 7,262,695 | B2 | 8/2007 | Hicks |
| 7,269,403 | B1 | 9/2007 | Miao |
| 7,349,325 | B2 | 3/2008 | Trzeciak et al. |
| 7,391,317 | B2 | 6/2008 | Abraham et al. |
| 7,440,443 | B2 | 10/2008 | Logvinov et al. |
| 7,583,952 | B2 | 9/2009 | Lee et al. |
| 7,725,096 | B2 | 5/2010 | Riveiro et al. |
| 7,751,414 | B2 | 7/2010 | Lee et al. |
| 2005/0071645 | A1 * | 3/2005 | Girouard et al. ............... 713/183 |
| 2006/0143705 | A1 * | 6/2006 | Sentoff ........................... 726/19 |
| 2007/0028299 | A1 * | 2/2007 | Albano ............................ 726/5 |
| 2007/0039042 | A1 | 2/2007 | Apelbaum |
| 2007/0075843 | A1 | 4/2007 | Riveiro et al. |
| 2007/0076666 | A1 | 4/2007 | Riveiro et al. |
| 2007/0229231 | A1 | 10/2007 | Hurwitz et al. |
| 2007/0271398 | A1 * | 11/2007 | Manchester et al. .......... 709/249 |
| 2008/0080380 | A1 | 4/2008 | Lee et al. |
| 2008/0130640 | A1 | 6/2008 | Hurwitz et al. |
| 2009/0156159 | A1 | 6/2009 | Lim et al. |
| 2009/0252209 | A1 | 10/2009 | Riveiro et al. |
| 2009/0323829 | A1 | 12/2009 | Riveiro et al. |

OTHER PUBLICATIONS

International Search Report and Written Opinion—PCT/US2012/029117—ISA/EPO—May 24, 2012.

* cited by examiner

*Primary Examiner* — Edward Zee
*Assistant Examiner* — Chi Nguy
(74) *Attorney, Agent, or Firm* — Mahamedi Paradice Kreisman LLP

(57) ABSTRACT

A method and apparatus for providing a passphrase-based security setup for a hybrid network including multiple network interfaces configured for communicating over one or more communication media are provided. The method includes receiving a passphrase from a user at a network interface of the multiple network interfaces. The received passphrase is then used for authenticating the device for one or more network interfaces. The authentication can be performed irrespective of a communication medium used by the network interfaces.

17 Claims, 8 Drawing Sheets

HYBRID NETWORKING MASTER PASSPHRASE

CROSS-REFERENCE TO RELATED APPLICATIONS

This application claims the benefit under 35 USC 119(e) of the co-pending and commonly owned U.S. Provisional Application No. 61/452,317 entitled "HYBRID HOME NETWORKING MASTER PASSPHRASE" filed on Mar. 14, 2011, the entirety of which is incorporated herein by reference. In addition, this application is related to co-pending and commonly owned U.S. patent application Ser. No. 13/420,144 entitled "HYBRID NETWORKING SIMPLE-CONNECT SETUP USING PROXY DEVICE" and to co-pending and commonly owned U.S. patent application Ser. No. 13/420,215 entitled "HYBRID NETWORKING SIMPLE-CONNECT SETUP USING FORWARDING DEVICE," both filed on Mar. 14, 2012, both the entireties of which are incorporated herein by reference.

TECHNICAL FIELD

The present embodiments relate generally to network technologies and specifically to hybrid networking solutions.

BACKGROUND OF RELATED ART

Increasingly, there is a desire by service providers and consumers to distribute high-quality digitally encoded content (e.g., data, voice, and video) to both stationary and mobile devices, and to enable and control through these devices a rich set of content-related services. However, there is currently not an integrated network solution that can enable such content-related services while also allowing for a user-friendly way to create and/or modify a hybrid network having multiple devices that operate according to different network technologies.

Existing hybrid networks, which may operate wirelessly and/or over hardwire connections, typically incorporate multiple network technologies (e.g., Wi-Fi, HomePlug AV, and Ethernet) that are based upon various different networking standards. Typically, the configuration, operation, and communication protocols of these different network technologies are created by different groups and thus may vary. More specifically, not only are the network connection setup procedures (e.g., for creating new networks, adding devices to an existing network, discovering connected devices, bridging to other devices/networks, and so on) associated with Wi-Fi, HomePlug AV, and Ethernet systems different from each other, devices operating according to one of these standards typically has difficulty connecting to (and thus communicating with) devices operating according to another of these standards without the use of bridging devices and/or complicated connection setup operations. From a user standpoint, it is desirable to have a single simplified mechanism for setting up and/or modifying a hybrid network that employs a multitude of different networking technologies. It is also desirable for the hybrid network to function as a single, seamless network that integrates different network technologies in a manner that is entirely transparent to the user.

Typically, networking technologies include security mechanisms to prevent unauthorized devices from forming networks with authorized devices, from joining an existing network, and from decoding data sent over the network. Wi-Fi and HomePlug AV are examples of network communication technologies or protocols that support these types of security mechanisms.

One technique for preventing unauthorized devices from forming or joining a network is to require devices to demonstrate that they possess a secret security key (e.g., a "pre-shared key") or password that is known to both the joining device and the device authenticating the joining device to the network. Such security keys may be associated with a single device (e.g., a device key) or may be associated with a network and known to all devices in the network (e.g., a network key).

Security keys that are used to encrypt user data to protect the data from being decoded by unauthorized devices can be generated during the authentication process. A common technique of ensuring that the joining device and the authenticating device possess the same security key is to require the user to enter the same password on both the joining device and the authenticating device, and in response thereto the joining device and the authenticating device may generate the same (e.g., pre-shared) security key.

Unfortunately, the specifics (e.g., the acceptable lengths, formats, and/or valid character sets) of passwords and security keys typically vary between different network technologies. For example, while the HomePlug network protocol may specify its passwords to include a first range (e.g., between N and M instances) of a first set of allowable characters (e.g., printable ASCII characters), the Wi-Fi network protocol may specify its passwords to include a second range (e.g., between X and Y instances) of a second set of allowable characters (e.g., all ASCII characters), where $N \neq X$, $M \neq Y$, and the first and second sets of characters are not the same. Additionally, the minimum number of characters allowed for HomePlug passwords may be greater than the minimum number of characters allowed for Wi-Fi passwords, and some characters allowed in HomePlug passwords (e.g., characters "[" and "]") may not be allowed in Wi-Fi passwords. As a result, current hybrid networks typically require a user to enter a different password and/or key for each type of network technology device seeking to form and/or join the hybrid network, which is not only burdensome but may also require the user to determine which type of network technology each device employs or worse, enter different passwords on the same device for different technologies.

Therefore, there is a need for a simple and unified authentication mechanism that allows a user to form and/or expand a hybrid network using devices that operate according to different network technologies.

SUMMARY

In accordance with the present embodiments, a simple and unified authentication mechanism is disclosed that allows a user to securely form and/or expand a hybrid network using devices that operate according to different network technologies using a single master passphrase. Thus, the present embodiments advantageously improve a user's experience when creating and/or modifying hybrid networks by unifying password-based authentication and setup operations for devices having network interfaces that operate according to various different network technologies or communication protocols. For example, rather than requiring a user to enter a number of different technology-specific passwords into devices that communicate using different network technologies, the present embodiments allow a single master passphrase to authenticate and connect various devices operating according to different network technologies to a hybrid network in a seamless and efficient manner. In addition, the present embodiments may be implemented in conjunction with various "simple connect" setup operations supported, for example, by Wi-Fi and HomePlug communication protocols.

More specifically, an exemplary method in accordance with the present embodiments for using a single master passphrase to join a number of devices to a hybrid network that facilitates data communication according to first and second communication protocols may be implemented as follows. First, the user enters the master passphrase into a first device having a first network interface of the first communication protocol, and enters the master passphrase into a second device having a second network interface of the second communication protocol enters. Next, the master passphrase is transformed in the first device, using a first transformation operation, to generate a first password compliant with the first communication protocol. The master passphrase is transformed in the second device, using a second transformation operation, to generate a second password compliant with the second communication protocol. Thereafter, the first password may be used to derive a first key compliant with the first communication protocol in the first device, and the second password may be used to derive a second key compliant with the second communication protocol in the second device. These keys may then be used to authenticate the first and second devices to corresponding sub-networks of the hybrid network.

For other embodiments, the authentication process may involve further transforming each password into a suitable key according to the communication protocol or network technology for which the particular password is intended. The derived keys may then be used to perform authentication and key distribution that are part of joining the network.

In this manner, the user may be able to advantageously use a single passphrase for the entire hybrid network, thereby not only alleviating the need to know which network protocol(s) each device in the network employs but also alleviating the need to enter separate passwords for each type of network interface. Further, if the master passphrase is obtained through a secure connection via a first network technology into a first network interface on a another device, then the master passphrase may be used to authenticate a second network interface on the other device, thereby eliminating the need to enter the master passphrase into the other device.

For other embodiments, the first and second devices may operate according to the same communication protocol, and/or may include multiple network interfaces that operate according to different communication protocols.

BRIEF DESCRIPTION OF THE DRAWINGS

The present embodiments are illustrated by way of example, and not by way of limitation, in the figures of the accompanying drawings and in which like reference numerals refer to similar elements and in which.

DETAILED DESCRIPTION

Figure 1:
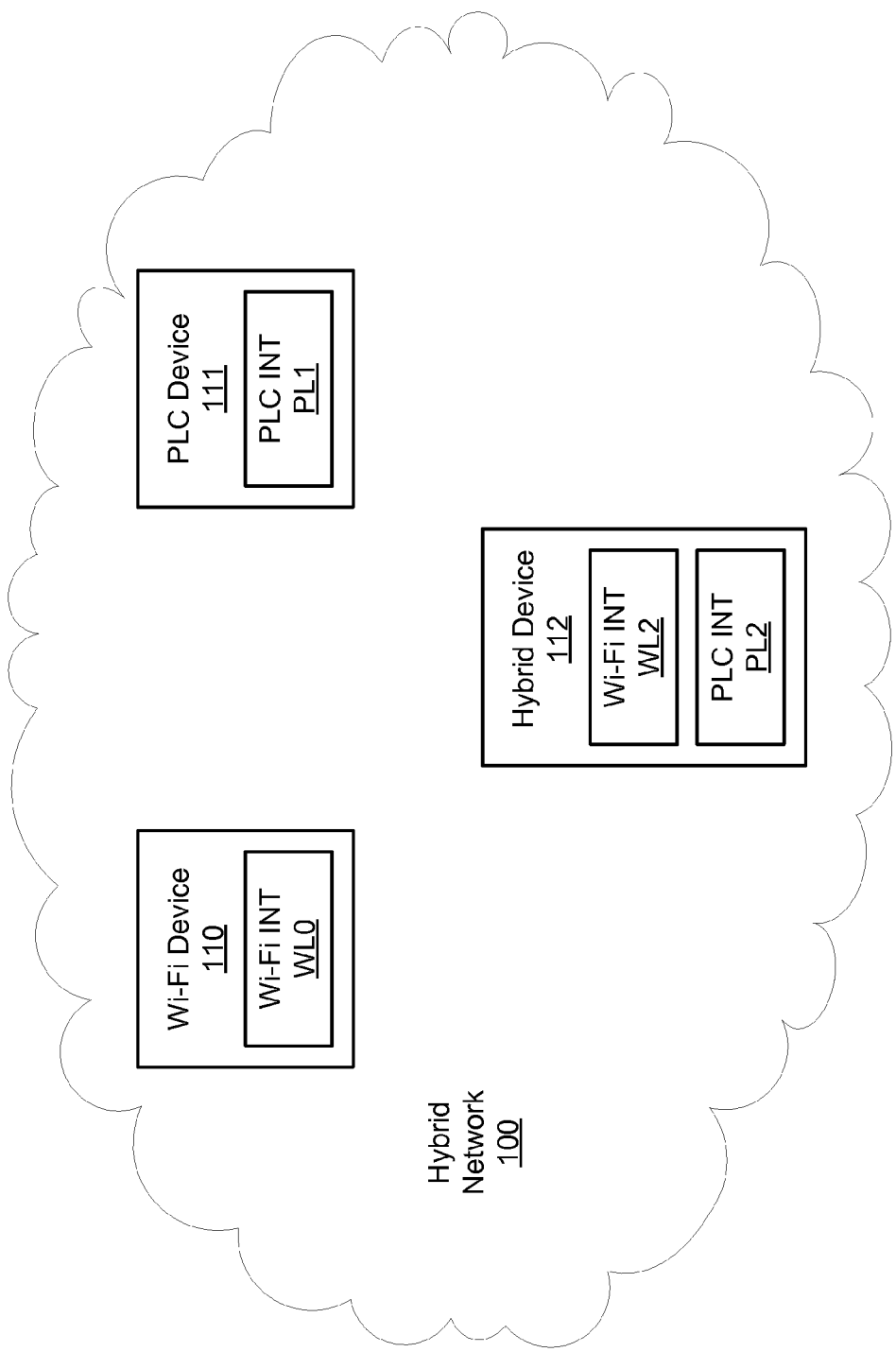
FIG. 1 is a block diagram of a hybrid network within which the present embodiments may be implemented.

A method and apparatus for establishing a security mechanism for a hybrid network are disclosed that allow a single master passphrase to create, authenticate, and/or add devices to the hybrid network regardless of which network technology or communication protocol each device employs to communicate with other devices. In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. The term "bus" includes both wired and wireless communication technologies, and does not depend on the number of devices connected to a communication medium. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather includes within its scope all embodiments defined by the appended claims.

As used herein, a Wi-Fi device may communicate with other Wi-Fi devices via a Wireless Local Area Network (WLAN). The terms Wi-Fi and WLAN can include communications governed by the IEEE 802.11 family of standards, Bluetooth, HiperLAN (a set of wireless standards, comparable to the IEEE 802.11 standard, used primarily in Europe), and other technologies having relatively short radio propagation range. Thus, the terms "Wi-Fi device" and "WLAN device" are interchangeable in this disclosure, and all refer to devices that have network interfaces that allow for communications governed by the IEEE 802.11 family of standards, Bluetooth, HiperLAN, and other technologies having relatively short radio propagation range.

Further, the term HomePlug AV (HPAV) refers to a collection of standards developed by the HomePlug Powerline Alliance and a collection of standards developed by the IEEE 1901 standards group (e.g., as described in the HomePlug family of standards and the IEEE 1901 family of standards) for applications such as in-home distribution of TV, gaming and Internet access, as well as for smart power meters and in-home communications between electric systems and appliances. The HPAV standards, which may also be referred to herein as Powerline Communications (PLC) standards, allow existing home electrical wiring to be used to facilitate communications between various in-home devices and/or to facilitate connecting to the Internet. Thus, the terms "Home-Plug AV device," "HPAV device," and "PLC device" are interchangeable in this disclosure, and all refer to devices that have network interfaces that allow for communications governed by the PLC standards and/or various HomePlug standards (e.g., HomePlug 1.0, HomePlug AV, HomePlug AV2, and so on).

The present embodiments also support Multimedia over Coax Alliance (MoCA) networking standards and other networking standards. For example, MoCA is a trade group promoting a standard that uses coaxial cables to connect consumer electronics and networking devices in homes, and allows both data communication and the transfer of audio and video streams between compliant devices. Thus, as used herein, the term "MoCA device" refers to devices that communicate in accordance with the MoCA standards.

For purposes of discussion herein, the term "pushbutton" may refer to any button, switch, touch, swipe, or other suitable user interface that when activated causes an associated device to commence network connection setup operations. Further, as used herein, the term "join device" refers to a device that may not currently be a member of a network but that has entered a "join state" (e.g., in response to activation of the device's pushbutton) that allows the device to commence simple connect setup operations to join the network. The term "add device" refers to a device that is currently a member of the network and that has entered an "add state" (e.g., in response to activation of the device's pushbutton) that allows the device to facilitate the addition of another device (e.g., the join device) to the network.

Further, as used herein, the terms "passphrase" and "password" refer to a sequence of characters or symbols (e.g., ASCII characters) that may be used establish a secure link between devices and/or networks, and may thus be interchangeable for purposes of discussion herein. The term "key" refers to a sequence of characters or symbols (e.g., ASCII characters) or a sequence of bits that may be used by one or more devices to form a new network, to join an existing network, and/or to authenticate one or more devices associated with a network. For some embodiments described herein, network passwords and device passwords may be derived from master passphrases using relatively simple transformation operations (e.g., character truncating, character padding, character replacement operations, and/or character encoding operations), and network keys and device keys may be derived from network passwords and device passwords, respectively, using relatively complex transformation operations (e.g., hashing techniques).

As mentioned above, in accordance with the present embodiments, a single master passphrase may be used to generate the security credentials (e.g., the passwords and/or security keys) for authenticating devices having network interfaces operating according to one or more different network technologies or communication protocols. Because the specifics (e.g., the acceptable lengths, formats, and/or valid character sets) of passwords and security keys typically vary between different network technologies, the specific techniques for generating such passwords and security keys vary for different network technologies. Thus, in accordance with the present embodiments, different types of the relatively simple transformation operation may be performed on the common master passphrase to generate different network technology-specific passwords and security keys. For some embodiments, the type of transformation operation performed on the common master passphrase to derive such passwords and/or security keys in a given device may be selected in response to the type of network interface(s) employed by the given device (e.g., whether the device has a network interface operating according to Wi-Fi communication protocols, PLC protocols, MoCA protocols, or a combination of such protocols).

For some embodiments, two types of master passphrases may be used when creating and/or modifying a hybrid network: a "device master passphrase" and a "network master passphrase." The device master passphrase (DMPP), which is specific to a given device, may be used to join the given device to the network and may be pre-shared by a device joining the network and an authenticating device. For some embodiments, the DMPP may be printed on a label that is attached to the device and also stored in non-volatile memory within the device (e.g., by a manufacturer of the device). Then, to join the device to a hybrid network, a user enters the DMPP indicated on the label into an authenticating device (e.g., that may already be a member of the network), and thereafter the join device and the authenticating device may perform the same transformation operation on the DMPP to generate the same network technology specific password, which in turn can be used to establish (e.g., authenticate) a secure link between the two devices and thereafter facilitate the joining of the join device to the network.

The network master passphrase (NMPP), which is known to all devices in the hybrid network, may be distributed to the network devices using a variety of techniques. For example, in one embodiment, the user may generate an NMPP and then enter the NMPP into each device that is to be joined to the network. In another embodiment, a given device may automatically generate the NMPP and display the NMPP (e.g., on a suitable UI provided on the given device) to the user, who in turn enters the NMPP into other devices seeking to join the network. In yet another embodiment, the NMPP may be transmitted from the authenticating device to the join device during authentication operations using other pre-shared device keys or passwords. The NMPP may then be transformed by each device to generate the same network technology specific passwords, which in turn may be used to establish (e.g., authenticate) a secure link between the two devices.

FIG. 1 is a block diagram of a hybrid network 100 within which the present embodiments may be implemented. System 100 is shown to include a Wi-Fi device 110, a PLC device 111, and a hybrid device 112. Wi-Fi device 110 includes a Wi-Fi interface WL0 that may operate according to the IEEE 802.11 family of standards, PLC device 111 includes a PLC interface PL1 that may operate according to the HPAV standards, the PLC standards, and/or the IEEE 1901 family of standards, and hybrid device 112 includes a Wi-Fi interface WL2 and a PLC interface PL2. Although only three devices 110-112 are shown in FIG. 1 for simplicity, it is to be understood that network 100 may include any number of devices having one or more network interfaces operating according to any suitable network communication technology or protocol. Further, although not shown in FIG. 1 for simplicity, network 100 may include other devices that include MoCA-compliant network interfaces that allow for communications governed by the MoCA standards.

Each of devices 110-112 can be any suitable device including, for example, a cell phone, PDA, tablet computer, laptop computer, wireless access point, modem, router, PLC network adaptor, internet protocol (IP) television, or other suitable device capable of communicating with other devices using Wi-Fi protocols, HPAV protocols, MoCA protocols, Ethernet protocols, and/or other protocols. Further, it is noted that the Wi-Fi interfaces of such devices may communicate with each other on the WLAN sub-network (not shown for simplicity) of hybrid network 100, the PLC interfaces of such devices may communicate with each other on the PLC sub-network (not shown for simplicity) of hybrid network 100, and so on.

Figure 2:
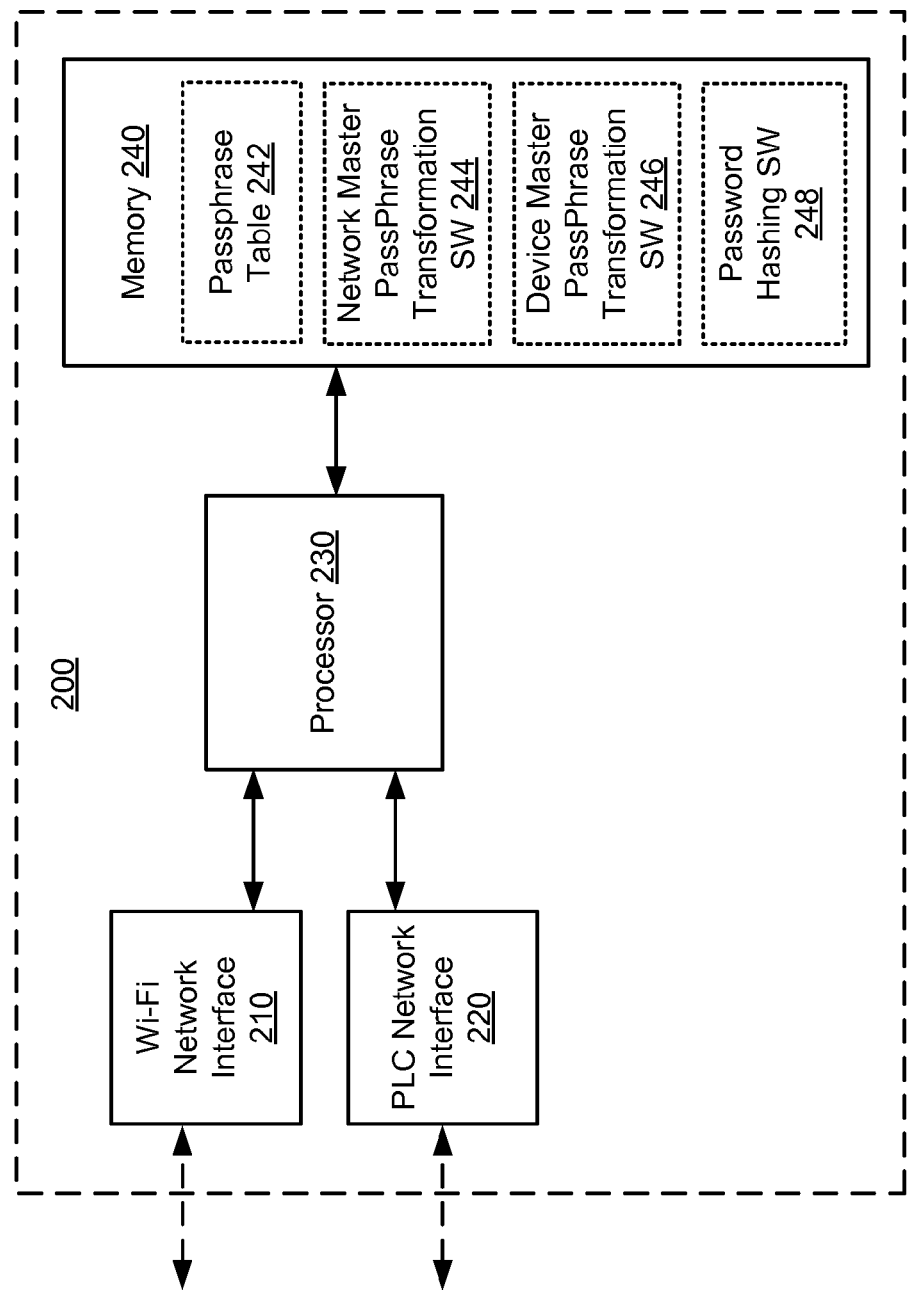
FIG. 2 is a block diagram of an exemplary one of the devices of the hybrid network of FIG. 1.

FIG. 2 shows a device 200 that is one embodiment of hybrid device 112 of FIG. 1. Device 200 includes a Wi-Fi network interface 210, a PLC interface 220, a processor 230, and a memory 240. The Wi-Fi network interface 210 includes a receiver/transmitter circuit (not shown for simplicity) that can be used to exchange data with other devices associated with network 100 using Wi-Fi (i.e., WLAN) protocols. The PLC network interface 220 includes a receiver/transmitter circuit (not shown for simplicity) that can be used to exchange data with other devices associated with network 100 using HPAV protocols and/or other PLC protocols.

Memory 240 includes a passphrase table 242 that stores various passwords, passphrases, keys, and/or PINs that may be used to establish secure links with other devices associated with network 100, to authenticate other devices associated with network 100, to facilitate the joining of device 200 to the network 100, and/or to facilitate the joining of other devices to the network 100. For example, table 242 may store a network master passphrase (NMPP), a device master passphrase (DMPP), HPAV network membership keys (NMKs), HPAV device access keys (DAKs), Wi-Fi network passwords (WLNPs), Wi-Fi pre-shared keys (PSKs), and other suitable passwords specific to any suitable network technology.

Memory 240 also includes a non-transitory computer-readable medium (e.g., one or more nonvolatile memory elements, such as EPROM, EEPROM, Flash memory, a hard drive, and so on) that stores the following software modules:

- a network master passphrase transformation software (SW) module 244 to generate network-technology specific network passwords in response to a network master passphrase (NMPP) that may be stored in table 242, entered via a suitable UI by a user, and/or provided from another device associated with the hybrid network 100;
- a device master passphrase transformation software module 246 to generate network-technology specific device passwords in response to a device master passphrase (DMPP) that may be stored in table 242, entered via a suitable UI by a user, and/or provided from another device associated with the hybrid network 100; and
- a password hashing software module 248 to generate network-technology specific keys in response to network-technology specific passwords.

Each software module includes instructions that, when executed by processor 230, cause the device 200 to perform the corresponding functions. The non-transitory computer-readable medium of memory 240 thus includes instructions for performing all or a portion of the operations of methods described below with respect to FIGS. 3-4.

Processor 230, which is coupled to Wi-Fi network interface 210, PLC network interface 220, and memory 240, can be any suitable processor capable of executing scripts or instructions of one or more software programs stored in device 200 (e.g., within memory 240). For example, processor 230 can execute network master passphrase transformation software (SW) module 244, device master passphrase transformation software (SW) module 246, and password hashing software module 248.

More specifically, processor 230 may execute network master passphrase transformation SW module 244 to generate any number of different network-technology specific network passwords from the NMPP using various transformation operations in accordance with the present embodiments. For example, execution of SW module 244 may perform a first transformation operation on the NMPP to generate a HPAV network password (NPW), may perform a second transformation operation on the NMPP to generate a WLAN network password (WLNP), and/or may employ other transformation operations on the NMPP to generate network passwords for other sub-network technologies.

Similarly, processor 230 may execute device master passphrase transformation SW module 246 to generate any number of different network-technology specific device passwords from the DMPP using various transformation operations in accordance with the present embodiments. For example, execution of SW module 246 may employ a first transformation operation on the DMPP to generate a HPAV device password (DPW), may employ a second transformation operation on the DMPP to generate a WLAN device password (WLDP), and/or may employ other transformation operations on the DMPP to generate device passwords for other sub-network technologies.

Processor 230 may execute password hashing SW module 248 to generate, for each type of network technology, a security key from the corresponding password(s) generated by passphrase transformation SW modules 244 and/or 246. More specifically, for HPAV network technologies, password hashing SW module 248 may derive a HPAV network membership key (NMK) from the HPAV network password (NPW), and/or may derive a HPAV device access key (DAK) from the HPAV device password (DPW). For WLAN network technologies, password hashing SW module 248 may derive a WLAN pre-shared key (PSK) from the WLAN network password (WLNP), and/or may derive a WLAN device key (WLDK) from the WLAN device PIN (WLDP).

Note that embodiments of Wi-Fi device 110 and PLC device 111 of FIG. 1 may be similar to the hybrid device 200 of FIG. 2, except for the number and/or type of network interfaces. For example, embodiments of Wi-Fi device 110 may include all the elements of hybrid device 200 except for the PLC interface 220, while embodiments of PLC device 111 may include all the elements of hybrid device 200 except for the Wi-Fi interface 210.

Figure 3:
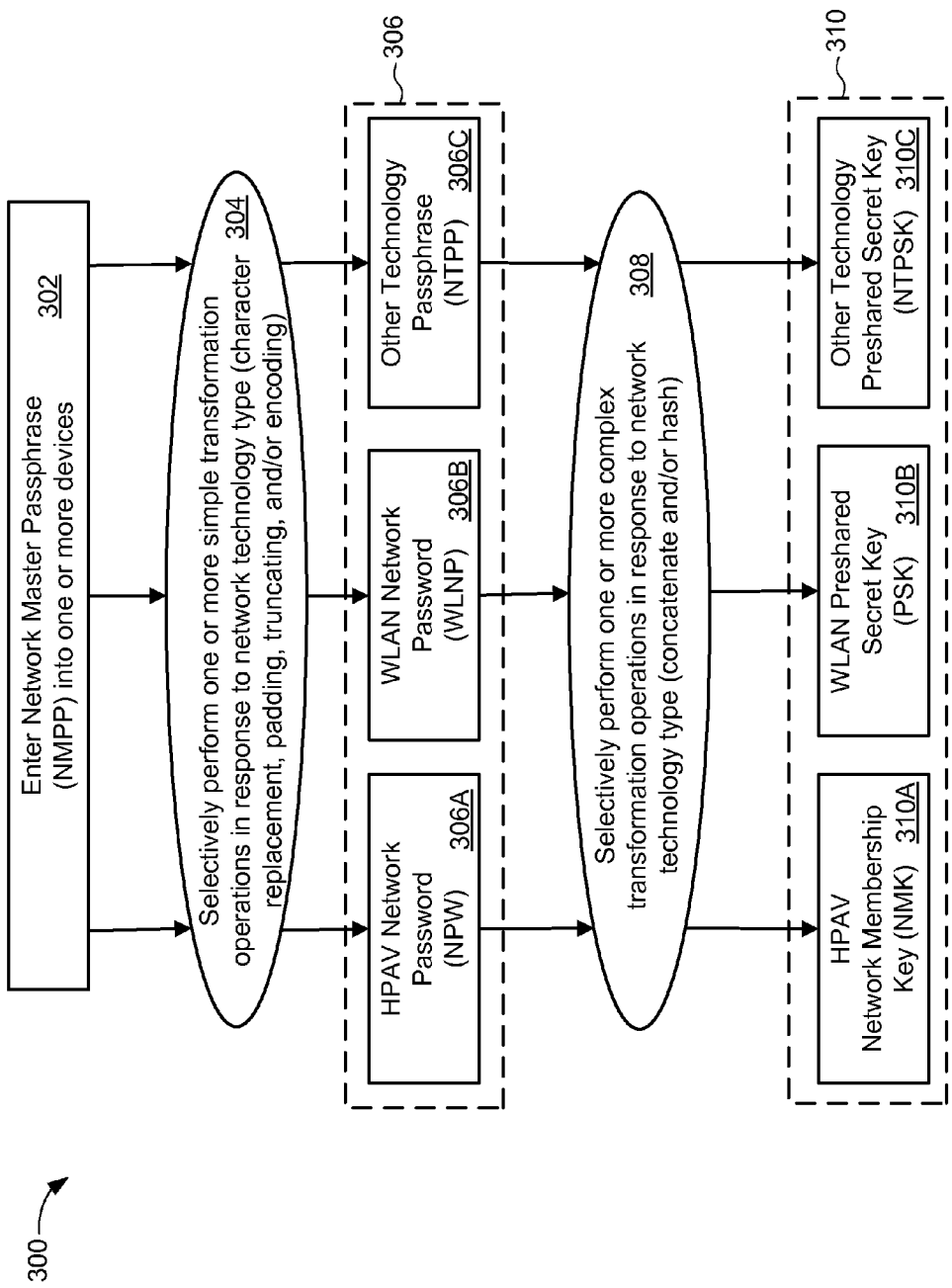
FIG. 3 is an illustrative flow chart depicting an exemplary operation for creating of a plurality of different technology-specific network passwords and keys from a single network master passphrase (NMPP) in accordance with some embodiments.

FIG. 3 is an illustrative flow chart 300 depicting an exemplary operation for creating a plurality of different technology-specific network passwords and/or keys from a single network master passphrase (NMPP) in accordance with some embodiments. First, a user enters the NMPP into one or more devices associated with hybrid network 100 (302). Note that the NMPP may be a superset of the HPAV network password (NPW) and the Wi-Fi network password (WLNP), as described in more detail below.

Then, one or more types of relatively simple transformation operations may be performed in the devices for which the NMPP has been entered and/or previously stored (304). For some embodiments, these relatively simple transformation operations may be selectively performed (e.g., according to which type of network-technology interface(s) the device employs) to generate one or more technology-specific network passwords (306). For some embodiments, the relatively simple transformation operations may selectively truncate characters of the NMPP, pad (e.g., add characters to) the NMPP, replace characters of the NMPP, and/or encode sets of characters of the NMPP to generate various technology-specific network passwords (306). For example, a first transformation operation may be performed on the NMPP to generate the HPAV network password (NPW) (306A), a second transformation operation may be performed on the NMPP to generate the WLAN network password (WLNP) (306B), and/or a third transformation operation may be performed on the NMPP to generate network passwords (NTPP) for other network technologies (306C).

As mentioned above, the specifics (e.g., the acceptable lengths, formats, and/or valid character sets) of passwords and security keys typically vary between different network technologies. For example, one network technology (e.g., HPAV) may permit passwords having between 8 and 64 instances (inclusive) of any printable ASCII character, while another network technology (e.g., Wi-Fi) may permit passwords having between 4 and 20 instances (inclusive) of only alphanumeric characters. Thus, in accordance with the present embodiments, if the target network technology does not allow its passwords to include non-alphanumeric characters (e.g., a space, tab, punctuation, and so on), then a network master passphrase (NMPP) that includes such non-alphanumeric characters may be transformed using a transformation operation that replaces such non-alphanumeric characters with predetermined alphanumeric characters and/or predetermined sequences of characters so that the technology-specific password generated from the NMPP is compliant with the target network technology (e.g., so that the resultant network technology-specific password contains only characters and/or symbols permitted by the target network technology). Conversely, if the NMPP does not include any characters disallowed by the target network technology, then the transformation employed to generate the technology-specific network password may not need to replace any characters of the NMPP when generating the network password from the NMPP.

If the NMPP contains fewer characters than the minimum number of password characters permitted by the target network technology (e.g., the NMPP is too short), then the NMPP may be padded in deterministic manner (e.g., with one or more characters or symbols such as "x" permitted by the target network technology. Padding characters may include characters deterministically derived from characters in the NMPP, including replicating characters in the NMPP and simple character substitution) using another transformation operation so that the network password generated from the NMPP complies with the target network technology (e.g., so that the resultant technology-specific password is of the shortest length permitted by the target network technology).

If the NMPP contains more characters than the maximum number of password characters permitted by the target network technology (e.g., the NMPP is too long), then the NMPP may be truncated using yet another transformation operation so that the network password generated from the NMPP complies with the target network technology (e.g., so that the resultant technology-specific password is of the longest length permitted by the target network technology). For other embodiments, a number of NMPP characters in excess of the longest length permitted by the target network technology may be combined with NMPP characters that would not otherwise be truncated to derive a new password (e.g., having the longest length permitted by the target network technology) from all the characters of the NMPP. Thus, for such other embodiments, rather than truncating part of the NMPP, one or more groups of characters of the NMPP are combined using a suitable character combination or encoding algorithm to produce a corresponding number of single characters or symbols permitted by the target network technology.

Regardless of the transformation operation(s) performed on the NMPP to generate the network passwords, it is important that the resultant technology-specific network passwords comply with the password requirements associated with the corresponding target network technologies, and that the network passwords are generated in a deterministic manner so that transforming a given NMPP using a particular one of the relatively simple transformation operations (e.g., character replacement, padding, truncating, and encoding) produces the same password irrespective of which device derives the network password(s) from the NMPP.

For alternate embodiments, derivation of a network password from an associated NMPP (e.g., using the relatively simple transformation operations in 304) for a given network technology may be performed by a first device that may or may not use the given network technology on behalf of a second device that uses the given network technology. These alternate embodiments may be employed for situations in which the second device does not implement the derivation of a network password from the NMPP according to the present embodiments. In this alternative embodiment, the network password may be displayed on the UI of the first device, thereby allowing the user to read the password and enter it into the UI on the second device.

Once the various technology-specific network passwords have been derived from the NMPP using the relatively simple transformation operations in accordance with the present embodiments, one or more relatively complex transformation operations may be performed on the derived network passwords in response to the network technology type (308) to generate one or more network security keys (310). For some embodiments, the relatively complex transformation operations may selectively hash or concatenate the network passwords to derive the network security keys, which in turn may be used to authenticate and/or join devices to the hybrid network. For other embodiments,
derivation of the keys may involve message exchanges between two devices along with suitable transformation operations. For example, to achieve greater security, the derivation of temporary keys may be functionally split between two devices and is performed as a by-product of authentication message exchanges.

More specifically, the HPAV network password (NPW) may be hashed according to a first hashing function to generate the HPAV network membership key (NMK) (310A), the WLAN network password (WLNP) may be hashed according to a second hashing function to generate the WLAN pre-shared secret key (PSK) (310B), and the other network password (NTTP) may be hashed according to a third hashing function to generate the pre-shared secret key (NTPSK) for the other network technology (310C). For some embodiments, the first, second, and third hashing functions may be different, while for other embodiments, one or more of the first, second, and third hashing functions may be the same.

Further, for alternate embodiments, derivation of a network security key from an associated network password (e.g., using the relatively complex transformation operation in 308) for a given network technology may be performed by a device that does not use the given network technology on behalf of another device that uses the given network technology. These alternate embodiments may be employed for situations in which the other device does not have a UI that allows a user to enter master passphrases or network passwords.

The resultant technology-specific network security keys may then be used to authenticate secure links between the devices, form the network, and/or to add devices to the hybrid network.

Figure 4:
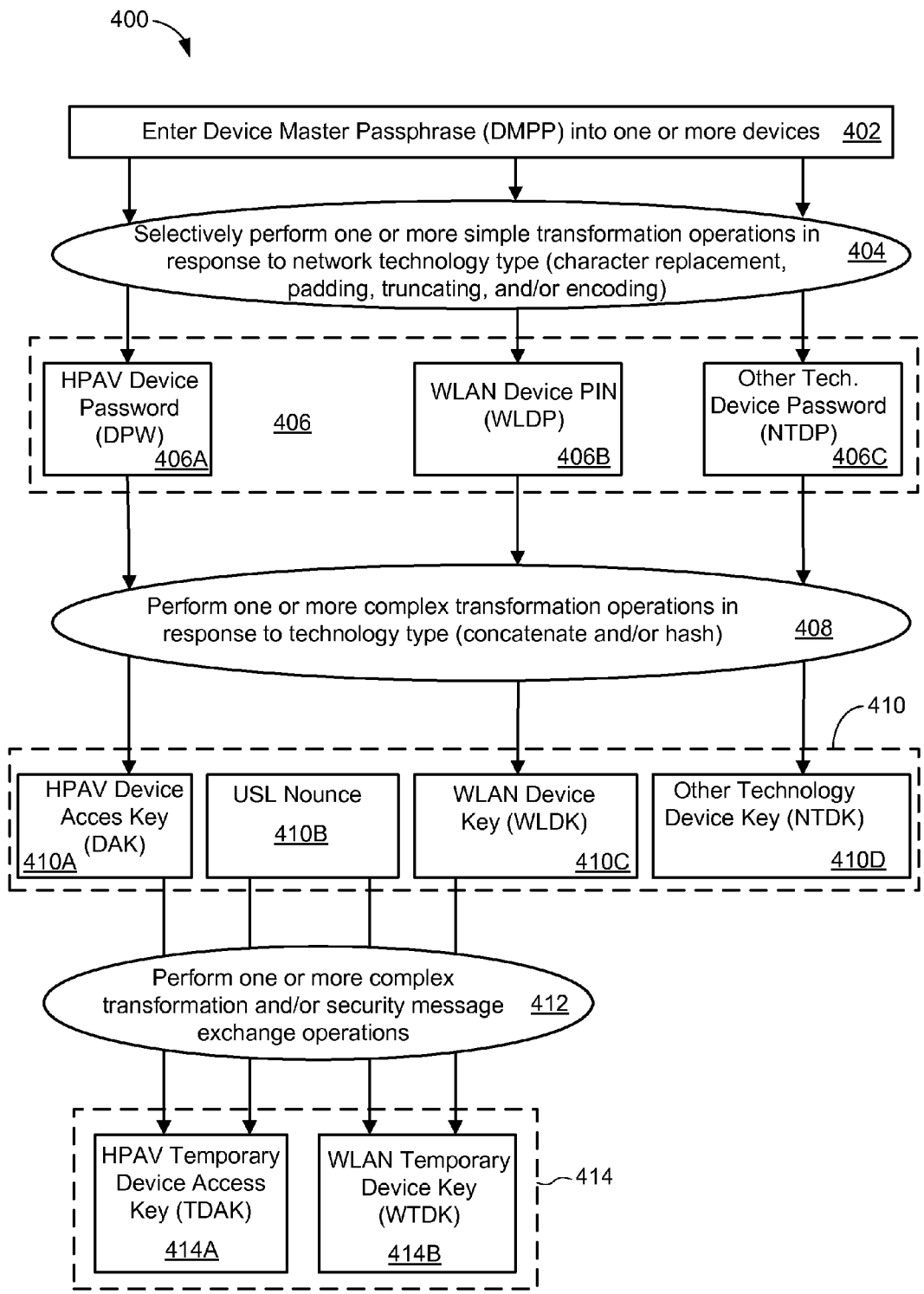
FIG. 4 is an illustrative flow chart depicting an exemplary operation for creating a plurality of different technology-specific device passwords and keys from a single device master passphrase (DMPP) in accordance with some embodiments.

FIG. 4 is an illustrative flow chart 400 depicting an exemplary operation for creating a plurality of different technology-specific device passwords and/or keys from a single device master passphrase (DMPP) in accordance with some embodiments. First, a user enters the DMPP into one or more devices associated with hybrid network 100 (402). Note that the DMPP may be a superset of the HPAV device password (DPW) and the Wi-Fi device password (WLDP), as described in more detail below.

Then, one or more types of relatively simple transformation operations are performed in the devices for which the DMPP has been entered and/or previously stored (404). For some embodiments, these relatively simple transformation operations may be selectively performed in response to various network technology types of the device's interfaces to generate one or more technology-specific device passwords (406). For some embodiments, the relatively simple transformation operations may selectively truncate characters of the DMPP, pad (e.g., add characters to) the DMPP, replace characters of the DMPP, and/or encode sets of characters of the DMPP to generate various technology-specific device passwords (406). For example, a first transformation operation may be performed on the DMPP to generate the HPAV device password (DPW) (406A), a second transformation operation may be performed on the DMPP to generate the WLAN device password (WLDP) (406B), and/or a third transformation operation may be performed on the DMPP to generate device passwords (NTDP) for other network technologies (406C).

As mentioned above, the specifics (e.g., the acceptable lengths, formats, and/or valid character sets) of passwords and security keys typically vary between different network technologies. For example, one network technology (e.g., HPAV) may permit passwords having between 8 and 64 instances (inclusive) of any printable ASCII character, while another network technology (e.g., Wi-Fi) may permit passwords having between 4 and 20 instances (inclusive) of only alphanumeric characters. Thus, in accordance with the present embodiments, if the target network technology does not allow its passwords to include non-alphanumeric characters (e.g., a space, tab, punctuation, and so on), then a device master passphrase (DMPP) that includes such non-alphanumeric characters may be transformed using a transformation operation that replaces such non-alphanumeric characters with predetermined alphanumeric characters and/or predetermined sequences of characters so that the technology-specific password generated from the DMPP is compliant with the target network technology (e.g., so that the resultant network technology-specific password contains only characters and/or symbols permitted by the target network technology). Conversely, if the DMPP does not include any characters disallowed by the target network technology, then the transformation employed to generate the technology-specific password may not need to replace any characters of the DMPP when generating the device password from the DMPP.

If the DMPP contains fewer characters than the minimum number of password characters permitted by the target network technology (e.g., the DMPP is too short), then the DMPP may be padding in deterministic manner (e.g., with one or more characters or symbols such as "x" permitted by the target network technology. Padding characters may include characters deterministically derived from characters in the DMPP, including replicating characters in the DMPP and simple character substitution) using another transformation operation so that the device password generated from the DMPP complies with the target network technology (e.g., so that the resultant technology-specific device password is of the shortest length permitted by the target network technology).

If the DMPP contains more characters than the maximum number of password characters permitted by the target network technology (e.g., the DMPP is too long), then the DMPP may be truncated using yet another transformation operation so that the device password generated from the DMPP complies with the target network technology (e.g., so that the resultant technology-specific device password is of the longest length permitted by the target network technology). For other embodiments, a number of DMPP characters in excess of the longest length permitted by the target network technology may be combined with DMPP characters that would not otherwise be truncated to derive a new password (e.g., having the longest length permitted by the target network technology) from all the characters of the DMPP. Thus, for such other embodiments, rather than truncating part of the DMPP, one or more groups of characters of the DMPP are combined using a suitable character combination or encoding algorithm to produce a corresponding number of single characters or symbols permitted by the target network technology.

Regardless of the transformation operation(s) performed on the DMPP to generate the device passwords, it is important that the resultant technology-specific device passwords comply with the password requirements associated with the corresponding target network technologies, and that the device passwords are generated in a deterministic manner so that transforming a given DMPP using a particular one of the relatively simple transformation operations (e.g., character replacement, padding, truncating, and encoding) produces the same password irrespective of which device derives the device password(s) from the DMPP.

For alternate embodiments, derivation of a device password from an associated DMPP (e.g., using the relatively simple transformation operations in 404) for a given network technology may be performed by a first device that may or may not use the given network technology on behalf of a second device that uses the given network technology. These alternate embodiments may be employed for situations in which the second device does not implement the derivation of a device password from the DMPP according to the invention. In this alternative embodiment, the device password is displayed on the UI of the first device, allowing the user to read the password and enter it into the UI on the second device.

Once the various technology-specific device passwords have been derived from the DMPP using the relatively simple transformation operations in accordance with the present embodiments, one or more relatively complex transformation operations may be performed on the device passwords in response to the network technology type (408) to generate one or more device security keys (410). For some embodiments, the relatively complex transformation operations may selectively hash or concatenate the device passwords to derive the device security keys, which in turn may be used to authenticate and/or join devices to the hybrid network. For example, for PLC sub-networks, the DAK of a join device may be used by a member device of the network to encrypt the network membership key (NMK) for transmitting to the join device, which in turn may use the DAK to decrypt the NMK and thereafter use the NMK to join the network.

More specifically, the HPAV device password (DPW) may be hashed according to a first hashing function to generate the HPAV device access key (DAK) (410A), the WLAN device password (WLDP) may be hashed according to a second hashing function to generate the WLAN device key (WLDK) (410C), and the other device password (NTDP) may be hashed according to a third hashing function to generate the device key (NTDK) for the other network technology (410D). For some embodiments, the first, second, and third hashing functions may be different, while for other embodiments, one or more of the first, second, and third hashing functions may be the same.

Further, for alternate embodiments, derivation of a device security key from an associated device password (e.g., using the relatively complex transformation operation in 408) for a given network technology may be performed by a device that does not use the given network technology on behalf of another device that uses the given network technology. These alternate embodiments may be employed for situations in which the other device does not have a UI that allows a user to enter master passphrases or device passwords.

In addition, the resultant technology-specific device keys may be transformed using one or more complex transformation and/or security message exchange operations in response to the network technology type (412) to generate temporary device keys (414). For example, the HPAV DAK may be transformed (e.g., hashed) to derive an HPAV temporary device access key (TDAK) (414A), and the WLAN device key may be transformed (e.g., hashed) to derive a WLAN temporary device key (WTDK) (414B). More specifically, for some embodiments, derivation of the keys may involve message exchanges between two devices along with suitable transformation operations. For example, to achieve greater security, the derivation of temporary keys may be functionally split between two devices and is performed as a by-product of authentication message exchanges (e.g., according to the "4-Way Handshake" as described in the 802.11 RSNA data confidentiality protocols).

Before describing specific examples of the present embodiments below with respect to FIGS. 5-8, it is noted that when a user creates a master passphrase (e.g., either a NMPP or a DMPP) and enters the master passphrase into devices having a UI, the devices may have a predetermined agreement and/or standard for performing the transformation operations that derive the technology-specific passwords from the master passphrase. For example, if a user creates a network using a laptop, then the user can join a selected device not having a UI by using DAK techniques. More specifically, for this example, the user may enter the DAK of the selected device into the laptop so that the laptop and the selected device have a common secret key that may be used to establish a secure link between them. Then, the laptop may encrypt the master passphrase and share the encrypted master passphrase with the selected device over the secure link. Then, the selected device may decrypt the encrypted master passphrase using its DAK, and thereafter perform transformation operations on the master passphrase to generate passwords and keys for joining the selected device to the network.

In addition, for situations in which a user desires to join a Wi-Fi device to an existing HPAV network that already has HPAV passwords and keys (e.g., thereby modifying the HPAV network to create a hybrid network), a selected one of the PLC devices may perform a reverse transformation operation on the HPAV network password (NPW) to derive a suitable NMPP that may be subsequently transformed (e.g., using another transform operation) to create generate a WLAN password (WLNP) that is compliant with the WLAN password requirements. For such embodiments, the selected PLC device may display the reverse-transformed NMPP to the user, and may also display the resulting WLAN password to the user (e.g., so that the user may enter the resulting WLAN password into the Wi-Fi device and thereby facilitate its authentication to the network.

Various exemplary setup operations using master passphrases in accordance with the present embodiments are described below with respect to FIGS. 5-8 in which distance is depicted in the horizontal direction and time is depicted in the vertical direction (with time increasing in the downward direction).

Figure 5:
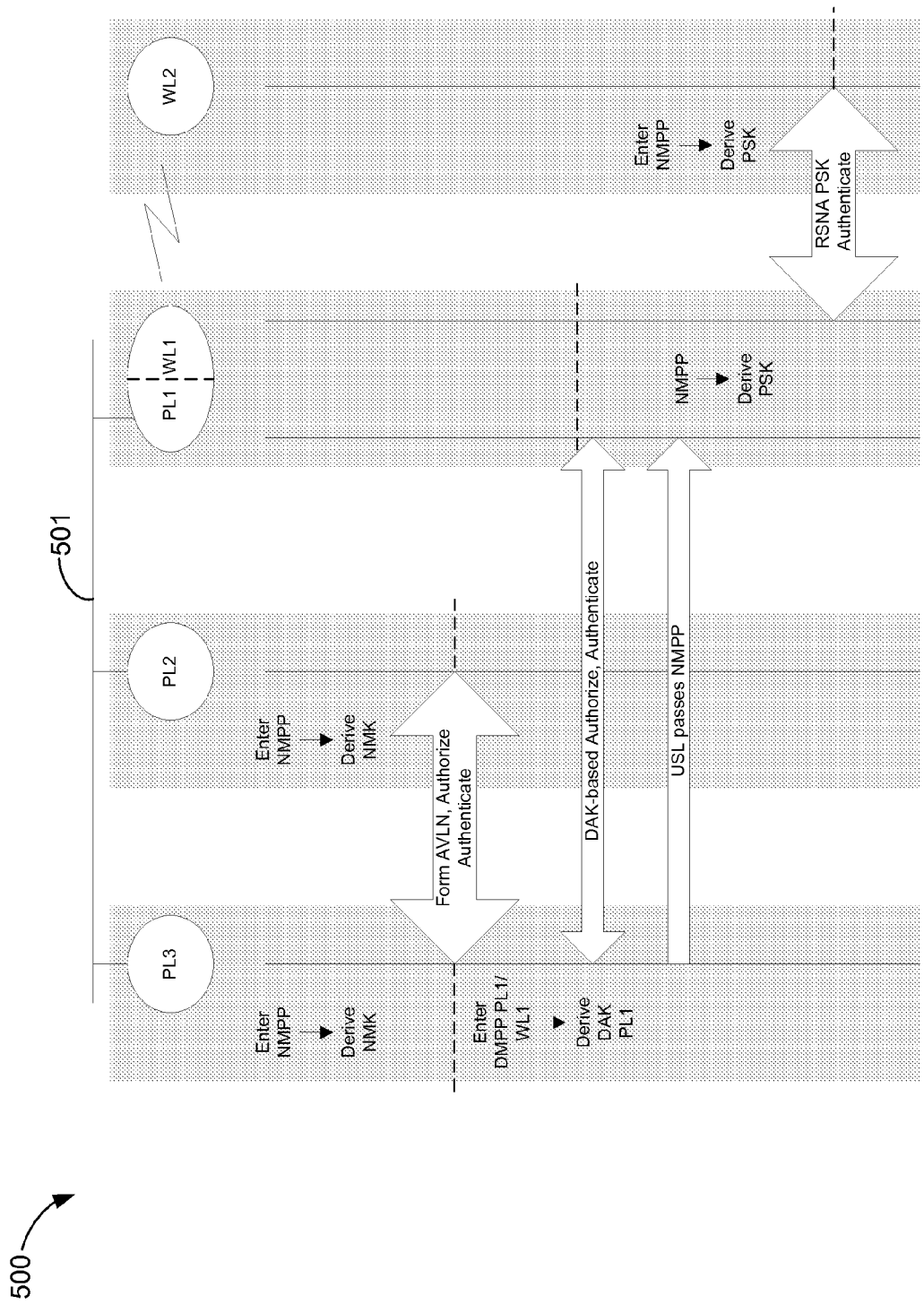
FIG. 5 is a sequence diagram illustrating message exchanges between interface devices for forming a network under an exemplary embodiment.

FIG. 5 is a sequence diagram illustrating message exchanges associated with forming a hybrid network 500 to include two PLC devices PL2 and PL3 each having a PLC network interface, a Wi-Fi device WL2 having a Wi-Fi network interface, and a hybrid PLC/Wi-Fi device PL1/WL1 having both PLC and Wi-Fi network interfaces. Note that after formation of network 500, PLC device interfaces PL1-PL3 may communicate with each other via a PLC sub-network 501 and Wi-Fi devices WL1-WL2 may communicate with each other via the Wi-Fi sub-network (not shown for simplicity). After the formation of network 500, if hybrid PLC/Wi-Fi device PL1/WL1 is capable of forwarding frames between the PLC sub-network and the Wi-Fi sub-network, then all the devices in network 500 can communicate with each other. For the example of FIG. 5, PLC devices PL2 and PL3 first form a network via mutual authentication using a user-entered network master passphrase (NMPP), followed by authentication of hybrid device PL1/WL1 using a device master password entered into PLC device PL3. During the authentication operation, the hybrid device PL1/WL1 obtains the NMPP from PLC device PL3 device, and thereafter uses the NMPP to authenticate the Wi-Fi device WL2.

More specifically, a user first enters the NMPP into PLC devices PL2 and PL3, which in turn transform the NMPP to derive the NMK. Once both PLC devices PL2 and PL3 have derived the NMK from the NMPP, devices PL2 and PL3 can form a PLC sub-network and authorize authentication of each other. After devices PL2 and PL3 have formed the PLC sub-network, the user enters the device master passphrase (DMPP) of hybrid device PL1/WL1 into device PL3. In response thereto, device PL3 derives the DAK of interface PL1 of the hybrid device PL1/WL1 from the DMPP (e.g., using suitable hashing techniques). Then, the derived DAK for interface PL1 of the hybrid device PL1/WL1 may be used to authorize and authenticate the PLC interface PL1 of hybrid device PL1/WL1.

For example, device PL3 can use the DAK of interface PL1 of the hybrid device PL1/WL1 to encrypt the NMK and transmits it to hybrid device PL1/WL1. Then, interface PL1 of the hybrid device PL1/WL1 decrypts the NMK using its pre-stored DAK, and thereafter joins the PLC sub-network 501 using the decrypted NMK.

Once interface PL1 of the hybrid device PL1/WL1 joins the PLC sub-network, device PL3 passes the NMPP to hybrid device PL1/WL1 over the now established PLC sub-network 501, and an upper software layer (USL) of the interface PL1 of the hybrid device PL1/WL1 passes the NMPP to the WLAN interface WL1 of hybrid device PL1/WL1. Then, the interface WL1 of the hybrid device PL1/WL1 can use the NMPP to derive the WLAN PSK. Note that passing of the NMPP from PLC device PL3 to hybrid device PL1/WL1 serves the same purpose as if the user had entered the NMPP directly into the Wi-Fi interface WL1 of the hybrid device PL1/WL1, but advantageously does not require the user to manually enter the NMPP into the hybrid device PL1/WL1. For other embodiments, the NMPP may be passed to hybrid device PL1/WL1 (or another device) in an encrypted message after establishing a secure link between the two devices.

Next, the user enters the NMPP into Wi-Fi device WL2, which in turn derives the WLAN PSK from the NMPP. Because the same NMPP has been provided or entered into both Wi-Fi devices WL1 and WL2, they both derive the same PSK, and therefore can establish a WLAN sub-network using the PSK according to, for example, the Robust Security Network Association (RSNA) authentication techniques.

Figure 6:
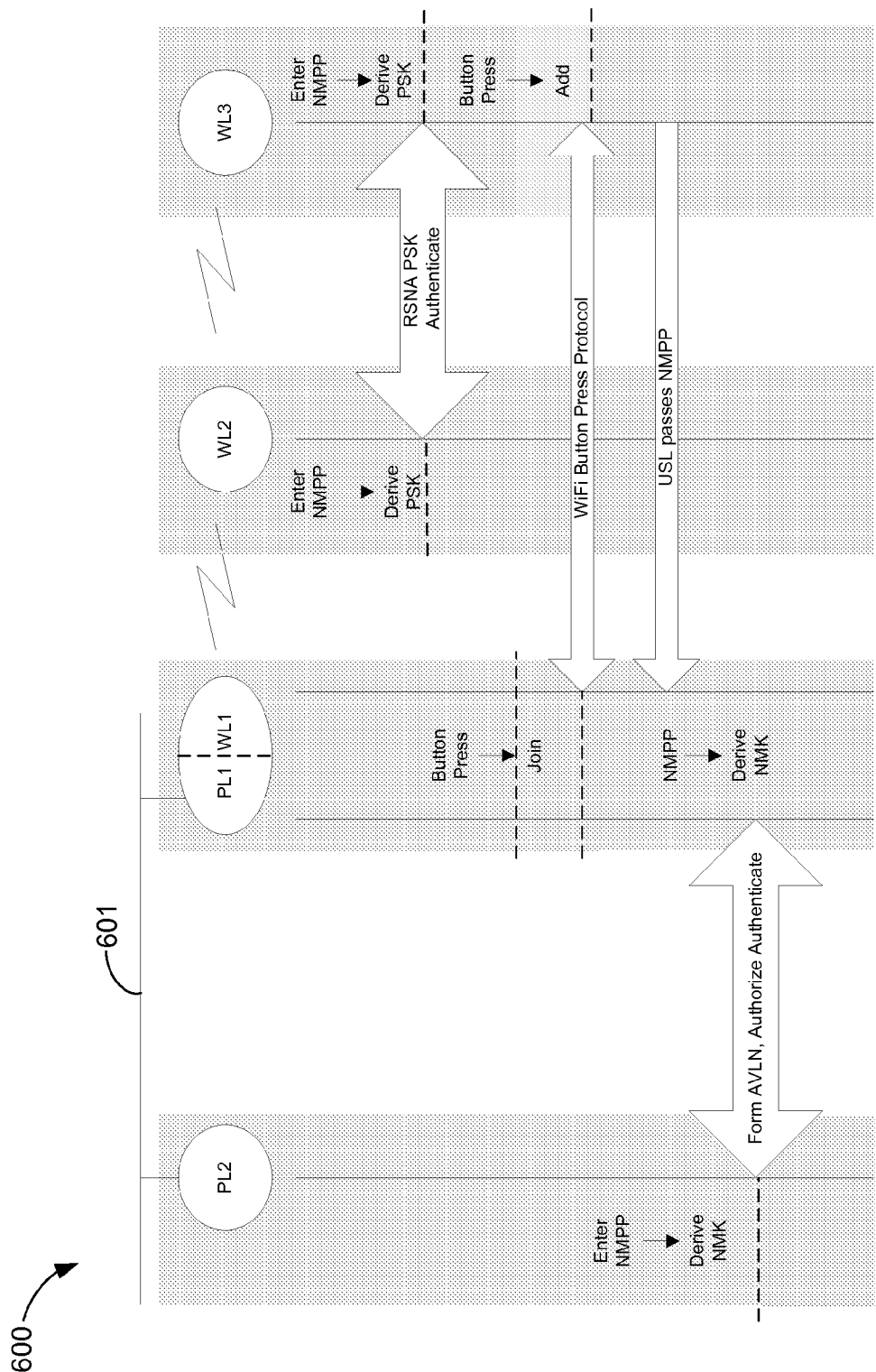
FIG. 6 is a sequence diagram illustrating message exchanges between interface devices for forming a network under another exemplary embodiment.

FIG. 6 is a sequence diagram illustrating message exchanges associated with forming a hybrid network 600 to include a PLC device PL2 having a PLC network interface, two Wi-Fi devices WL2 and WL3 each having a Wi-Fi network interface, and a hybrid PLC/Wi-Fi device PL1/WL1 having both PLC and Wi-Fi network interfaces. Note that after formation of network 600, PLC device interfaces PL1-PL2 may communicate with each other via a PLC sub-network 601 and Wi-Fi devices WL1-WL3 may communicate with each other via the Wi-Fi sub-network (not shown for simplicity). After the formation of network 600, if hybrid PLC/Wi-Fi device PL1/WL1 is capable of forwarding frames between the PLC sub-network and the Wi-Fi sub-network, then all the devices in network 600 can communicate with each other. For the example of FIG. 6, a combination of the network master passphrase (NMPP) and "simple connect" push-button setup operations are used to authenticate the devices to the hybrid network, whereby Wi-Fi devices WL2 and WL3 use the NMPP to authenticate each other, a simple-connect setup operation is used to connect the Wi-Fi device WL3 to the Wi-Fi interface WL1 of hybrid device PL1/WL1 and thereafter pass the NMPP to the hybrid device PL1/WL1. Then, the hybrid device PL1/WL1 forms a PLC sub-network with the PLC device PL2 using a common NMK derived from the NMPP in accordance with the present embodiments.

More specifically, a user first enters the NMPP into Wi-Fi devices WL2 and WL3, which in turn transform the NMPP to derive the WLAN network password and thereafter the PSK. Once both the Wi-Fi devices WL2 and WL3 have derived the same PSK from the NMPP, devices WL2 and WL3 authenticate each other using RSNA techniques and thereby form a WLAN sub-network. Then, the user activates pushbuttons on Wi-Fi device WL3 and on hybrid device PL1/WL1, which causes the Wi-Fi device WL3 to enter the add state and causes the Wi-Fi interface of hybrid device PL1/WL1 to enter the join state. The Wi-Fi devices WL3 and WL1 complete the Wi-Fi Button Press simple connect protocol to join the Wi-Fi interface WL1 of hybrid device PL1/WL1 to the Wi-Fi sub-network, and thereafter the USL of Wi-Fi device WL3 transmits the NMPP to the Wi-Fi interface WL1 of the hybrid device PL1/WL1. The hybrid device PL1/WL1 passes the NMPP from its Wi-Fi interface WL1 to its PLC interface PL1, which then transforms the NMPP to derive the HPAV NMK. The user then enters the NMPP into the PLC device PL2, which in response thereto derives the HPAV NMK using transformation operations in accordance with the present embodiments. Because now both the PLC device PL2 and the PLC interface PL1 of hybrid device PL1/WL1 have the same NMK, they are able to authenticate each other and form a PLC sub-network 601.

Figure 7:
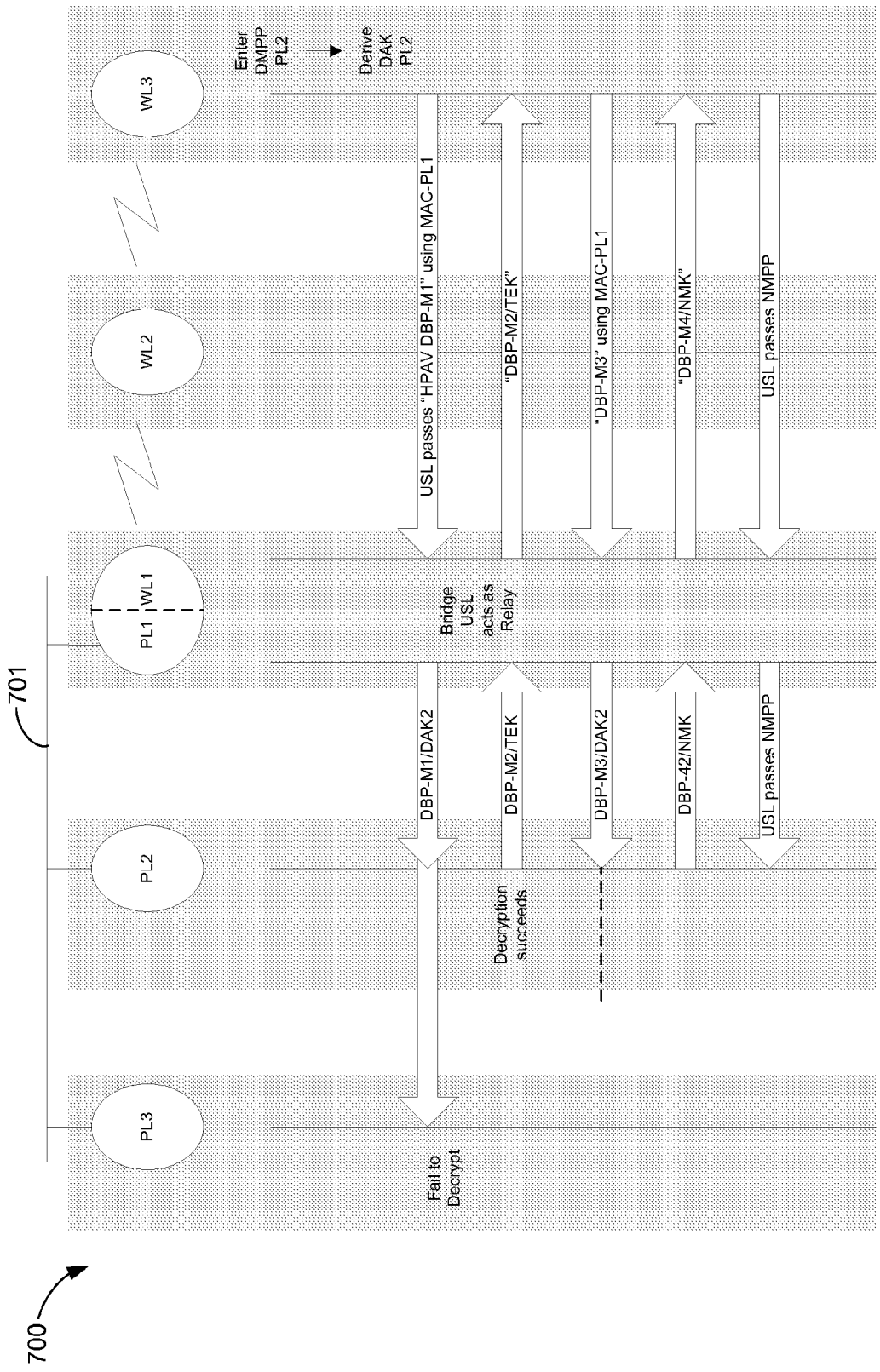
FIG. 7 is a sequence diagram illustrating message exchanges between interface devices for joining a device to a network under yet another exemplary embodiment.

FIG. 7 is a sequence diagram illustrating message exchanges associated with adding to a hybrid network 700 two PLC devices PL2 and PL3 each having a PLC network interface. Note that as used herein, "adding" devices to a network may also refer to adding devices to a new network (e.g., thereby "forming" a new network). For the example of FIG. 7, Wi-Fi devices WL2-WL3 and the Wi-Fi interface WL1 of hybrid device PL1/WL1 are already members of a WLAN sub-network. Note that after formation of network 700, PLC device interfaces PL1-PL3 may communicate with each other via a PLC sub-network 701. After the formation of network 700, if hybrid PLC/Wi-Fi device PL1/WL1 is capable of forwarding frames between the PLC sub-network and the Wi-Fi sub-network, then all the devices in network 700 can communicate with each other. The PLC device PL2 is authenticated to the network with a device master passphrase (DMPP) using Wi-Fi device WL3 as the authenticating device. The hybrid device PL1/WL1 relays authentication messages between the authenticated PL2 device and the authenticating WL3 device. Note that for the exemplary diagram of FIG. 7, the Wi-Fi device WL3 passes a first HPAV DAK-Based Protocol (DBP) message (DBP-M1) to the hybrid device PL1/WL1, which in turn sends the DBP-M1 and DAK2 to PLC devices PL2 and PL3. Thus, as used herein, DBP-Mn refers to a DAK-based protocol message Mn, where n is an integer.

Figure 8:
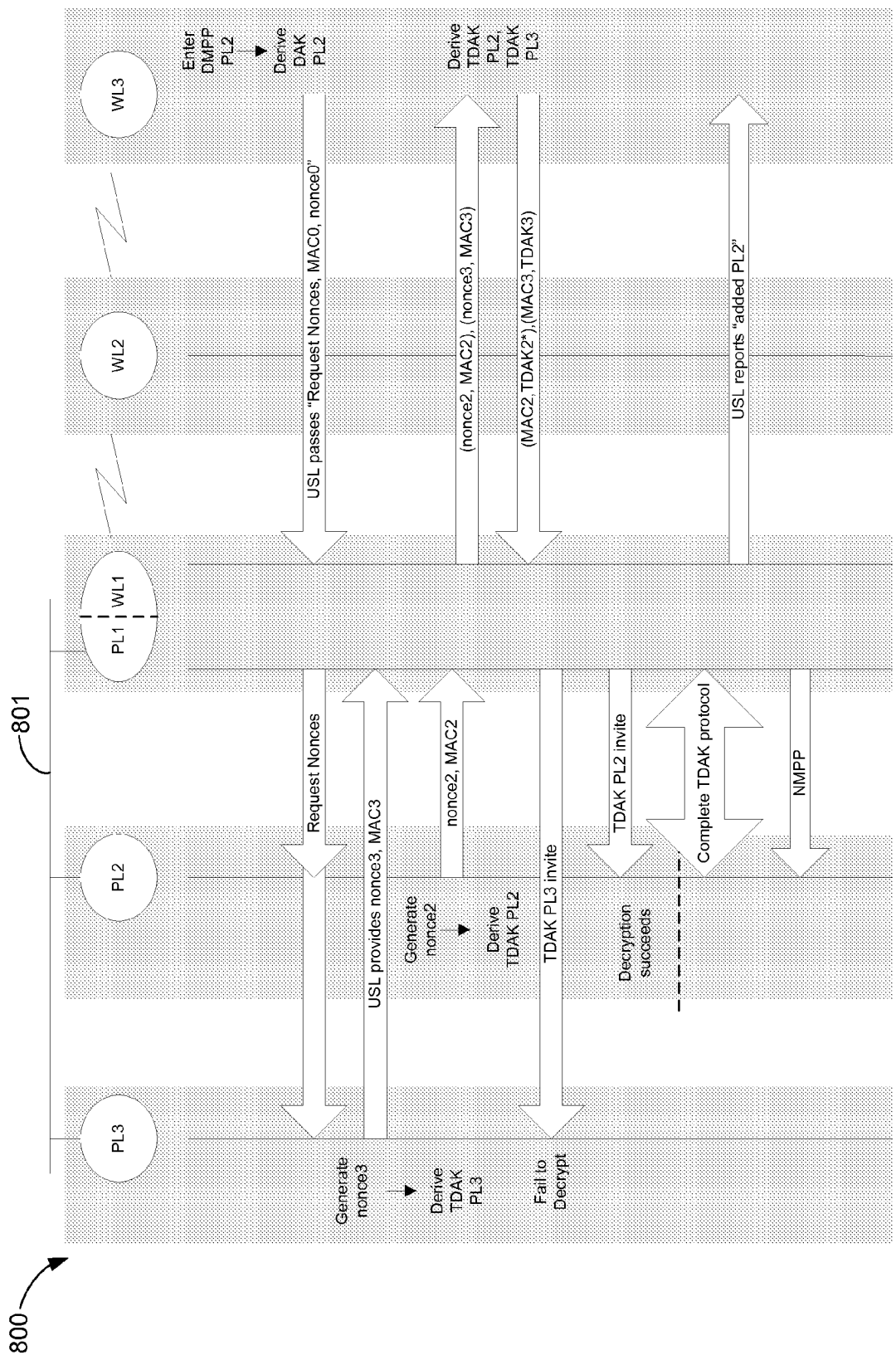
FIG. 8 is a sequence diagram illustrating message exchanges between interface devices for joining a device to a network under still another exemplary embodiment.

FIG. 8 is a sequence diagram 800 illustrating message exchanges between interface devices for adding devices to a network under yet another exemplary embodiment. The situation for this embodiment is similar to the situation shown in FIG. 7; a PLC device PL2 is authenticated to the network with a device master passphrase using a Wi-Fi device WL3 as the authenticating device, with the assistance of hybrid device PL1/WL1. However, the specifics of the authentication mechanism are different from that described above with respect to FIG. 7. More specifically, for the example of FIG. 8, temporary keys are derived and device PL1/WL1 functions as a proxy for device WL3 on the PLC sub-network to facilitate the execution of the authentication protocol.

In the foregoing specification, the present embodiments have been described with reference to specific examples. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

The present embodiments can be provided as a computer program product, or software, that may include a non-transitory machine-readable medium having stored thereon instructions. The machine readable medium may be used to program a computer system (or other electronic devices) to implement the present embodiments. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions.

What is claimed is:

1. A hybrid network having first and second sub-networks operating according to first and second communication protocols, respectively, wherein the first and second communication protocols are different and are selected from a HomePlug protocol and a wireless local area network (WLAN) protocol, the hybrid network including a first device comprising:
   a first network interface of the first communication protocol;
   a first processor; and
   a first memory coupled to the first processor and having stored therein first computer-executable instructions that when executed by the first processor cause the first device to:
   receive a master passphrase from a user;
   transform the master passphrase into a first password compliant with the first communication protocol by selectively truncating, adding, or replacing characters of the master passphrase to generate the first password in response to the first communication protocol;
authenticate the first device to the first sub-network using the first password;
hash the first password to derive a first key compliant with the first communication protocol; and
join the first device to the first sub-network using the first key.

2. The hybrid network of claim 1, further including a second device comprising:
a second network interface of the second communication protocol;
a second processor; and
a second memory coupled to the second processor and having stored therein second computer-executable instructions that when executed by the second processor cause the second device to:
receive the master passphrase from the user;
transform the master passphrase into a second password compliant with the second communication protocol by selectively truncating, adding, or replacing characters of the master passphrase to generate the second password in response to the second communication protocol;
authenticate the second device to the second sub-network using the second password;
hash the second password to derive a second key compliant with the second communication protocol; and
join the second device to the second sub-network using the second password.

3. The hybrid network of claim 1, the first memory having stored therein additional computer-executable instructions that when executed by the first processor cause the first device to:
transmit the master passphrase from the first device to a third device having a network interface of the first or second communication protocol.

4. A method for adding a number of devices to a hybrid network having first and second sub-networks operating according to first and second communication protocols, respectively, wherein the first and second communication protocols are different and are selected from a HomePlug protocol and a wireless local area network (WLAN) protocol, the method comprising:
entering a master passphrase into a first device, wherein the first device comprises a first network interface of the first communication protocol;
transforming the master passphrase, using a first transformation operation in the first device, to generate a first password compliant with the first communication protocol, wherein the first transformation operation comprises selectively truncating, adding, or replacing characters of the master passphrase to generate the first password in response to the first communication protocol;
authenticating the first device to the first sub-network using the first password;
hashing the first password to derive a first key compliant with the first communication protocol; and
joining the first device to the first sub-network using the first key.

5. The method of claim 4, further comprising:
sending the master passphrase from the first device to a third device in an encrypted message.

6. The method of claim 4, further comprising:
entering a master passphrase into a second device, wherein the second device comprises a second network interface of the second communication protocol;
transforming the master passphrase, using a second transformation operation in the second device, to generate a second password compliant with the second communication protocol, wherein the second transformation operation comprises selectively truncating, adding, or replacing characters of the master passphrase to generate the second password in response to the second communication protocol;
authenticating the second device to the second sub-network using the second password;
hashing the second password to derive a second key compliant with the second communication protocol; and
joining the second device to the second sub-network using the second key.

7. The method of claim 6, further comprising:
transmitting the master passphrase from the first device to a third device having network interfaces of the first and second communication protocols, wherein the third device is to transform the master passphrase, using the second transformation operation, to generate the second password in the third device.

8. The method of claim 7, wherein the third device is to:
hash the second password to derive the second key; and
join the third device to the hybrid network using the second key.

9. The method of claim 4, further comprising:
selecting, in a third device that is an existing member of the hybrid network, a third password previously used to join the third device to the hybrid network; and
deriving, using a reverse transformation operation in the third device, the master passphrase from the third password.

10. The method of claim 4, further comprising:
deriving the master passphrase in a third device having a network interface of the first communication protocol on behalf of a fourth device that does not perform the transformation operations.

11. A system for adding a number of devices to a hybrid network having first and second sub-networks operating according to first and second communication protocols, respectively, wherein the first and second communication protocols are different and are selected from a HomePlug protocol and a wireless local area network (WLAN) protocol, the system comprising:
means for entering a master passphrase into a first device, wherein the first device comprises a first network interface of the first communication protocol;
means for transforming the master passphrase, using a first transformation operation in the first device, to generate a first password compliant with the first communication protocol, wherein the first transformation operation is to selectively truncate, add, or replace characters of the master passphrase to generate the first password in response to the first communication protocol;
means for authenticating the first device to the first sub-network using the first password;
means for hashing the first password to derive a first key compliant with the first communication protocol; and
means for joining the first device to the first sub-network using the first key.

12. The system of claim 11, further comprising:
means for sending the master passphrase from the first device to a third device in an encrypted message.

13. The system of claim 11, further comprising:
means for entering a master passphrase into a second device, wherein the second device comprises a second network interface of the second communication protocol;
means for transforming the master passphrase, using a second transformation operation in the second device, to generate a second password compliant with the second communication protocol, wherein the second transformation operation is to selectively truncate, add, or replace characters of the master passphrase to generate the second password in response to the second communication protocol;
means for authenticating the second device to the second sub-network using the second password;
means for hashing the second password to derive a second key compliant with the second communication protocol; and
means for joining the second device to the second sub-network using the second key.

14. The system of claim 13, further comprising:
means for transmitting the master passphrase from the first device to a third device having network interfaces of the first and second communication protocols, wherein the third device is to transform the master passphrase, using the second transformation operation, to generate the second password in the third device.

15. The system of claim 14, wherein the third device is to:
hash the second password to derive the second key; and
join the third device to the hybrid network using the second key.

16. The system of claim 11, further comprising:
means for selecting, in a third device that is an existing member of the hybrid network, a third password previously used to join the third device to the hybrid network; and
means for deriving, using a reverse transformation operation in the third device, the master passphrase from the third password.

17. The system of claim 11, further comprising:
means for deriving the master passphrase in a third device having a network interface of the first communication protocol on behalf of a fourth device that does not perform the transformation operations.

\* \* \* \* \*